Figure 4:
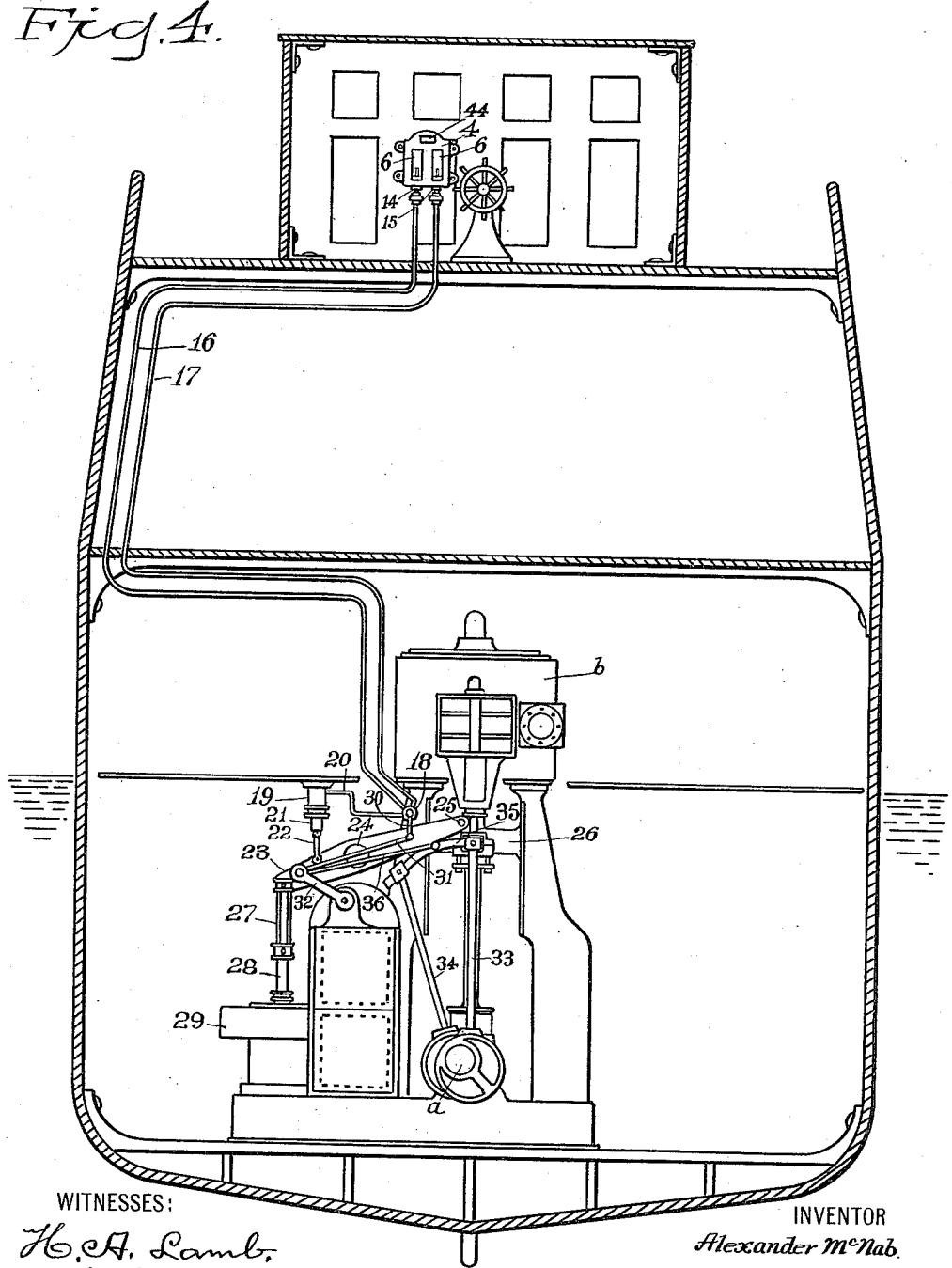

A. McNAB.
INDICATING DEVICE.
APPLICATION FILED SEPT. 25, 1911.
1,024,452.
Patented Apr. 23, 1912.
2 SHEETS—SHEET 1.
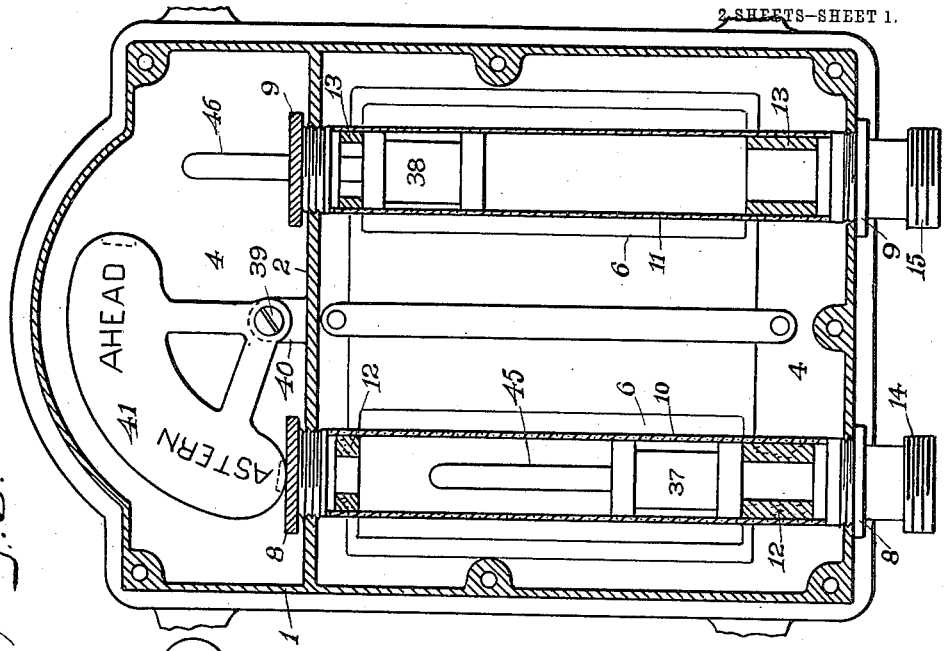
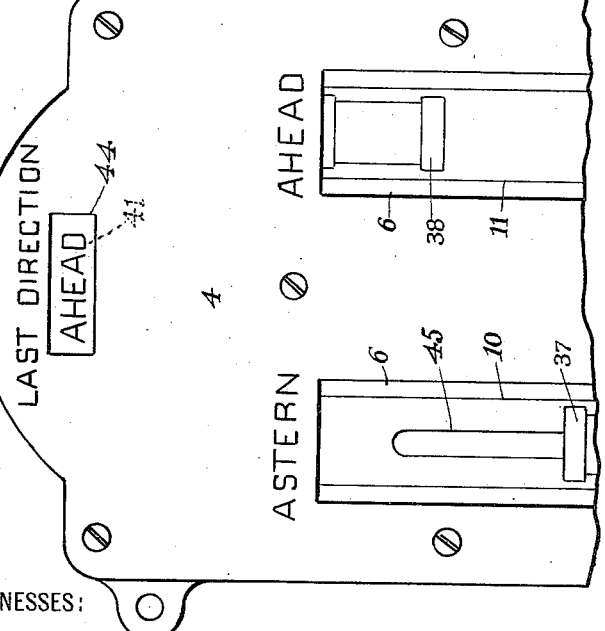
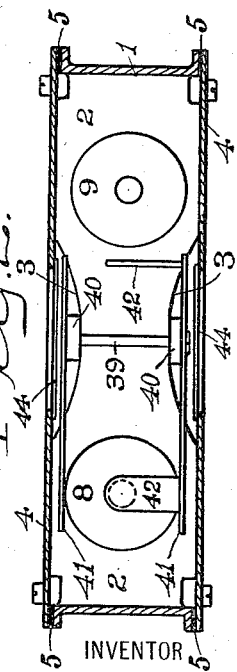
WITNESSES:
H. A. Lamb
M. J. Lougden
INVENTOR
Alexander McNab.
BY
ATTORNEY
COLUMBIA PLANOGRAPH CO., WASHINGTON, D. C.

A. McNAB.
INDICATING DEVICE.
APPLICATION FILED SEPT. 25, 1911.

1,024,452.

Patented Apr. 23, 1912.

2 SHEETS—SHEET 2.

WITNESSES:
H. A. Lamb
M. J. Louden

INVENTOR
Alexander McNab.

BY
ATTORNEY

UNITED STATES PATENT OFFICE.

ALEXANDER McNAB, OF BRIDGEPORT, CONNECTICUT, ASSIGNOR TO THE McNAB COMPANY, OF BRIDGEPORT, CONNECTICUT, A CORPORATION OF CONNECTICUT.

INDICATING DEVICE.

1,024,452. Specification of Letters Patent. Patented Apr. 23, 1912.

Application filed September 25, 1911. Serial No. 651,278.

*To all whom it may concern:*

Be it known that I, ALEXANDER McNAB, a subject of George V, King of Great Britain, and residing in the city of Bridgeport, county of Fairfield, State of Connecticut, United States of America, have invented certain new and useful Improvements in Indicating Devices; and I do declare the following to be a full, clear, and exact description of the invention, such as will enable others skilled in the art to which it appertains to make and use the same.

My invention relates to apparatus for indicating the directions of the revolutions of a shaft, particularly the shafts of steamship propellers, and refers to that class of apparatus in which the indicating devices are operated by air impulses conducted through pipes that are connected to an air pump driven by the engine, said pump acting upon the air in the pipes so as to cause the air to be agitated for the purpose of moving elements which actuate the indicating devices. Hitherto these pipes have been open to the atmosphere but I have found that by closing the pipes to the outer air a better effect is obtained, not only because the pump has a more definite action on the air in the pipes which is forced against and drawn back from said elements and insures their effective working, but also because all parts operated by the air impulses are effectually protected as against the elements, such as rain, snow, ice and the like. In fact, an apparatus of this description whose interior working parts are open to the outside air is practically useless.

I incase the parts of my improvement within an air tight receptacle which is provided with glass panels at the sides so that the indicators may be visible at either side of the casing; furthermore, I provide means whereby a slight clacking will be audible when the engine is reversing, while my apparatus is noiseless during the forward movement of the engine; I also provide means whereby the indicators will operate a semaphore for the purpose of determining the last direction in which the engine is moving, whether forward or reverse.

I have endeavored to perfect a system which can be installed economically and which, as before stated, will operate reliably, and which will not readily get out of order.

When applied to a ship's propeller shaft my improvement is particularly valuable in that it indicates the movement of the shaft so that a person in the pilot house or on the bridge can instantly know of it. Any number of indicators may be installed in my system in convenient places.

I have illustrated my invention particularly as applied to steam engines, but it may of course be used with any other type of engine.

The visible indicator is especially valuable when docking or otherwise maneuvering a vessel. By its use the pilot is shown instantly and automatically whether or not his commands have been obeyed by the engineer.

The accompanying two sheets of drawing indicate the principle of the invention and one form of apparatus for carrying it into effect.

Figure 1 is a broken front elevation of the indicator apparatus proper—Fig. 2 an interior top view with the casing and cover plates sectioned—Fig. 3 a vertical sectional elevation, and Fig. 4 is a transverse section of a ship showing the arrangement of the parts of my invention.

Similar numerals of reference denote like parts in the several figures of the drawing.

1 is the casing divided near the upper portion by a transverse partition 2 having cut away portions 3 whereby the upper and lower portions of the casing may communicate, and 4 are cover plates secured to said casing with intermediate gaskets 5 so as to exclude the air from said casing and render the latter perfectly air tight. 6 are glass panels secured in any suitable manner to the cover plates said panels being four in number and located in pairs, the members of each pair being directly opposite each other. Driven through suitable perforations in said partition and in the bottom of the casing are binding nuts 8, 8, and 9, 9, and confined between the nuts 8, 8, in vertical disposition is the glass indicator tube 10, while similarly confined between the nuts 9, 9, is the glass indicator tube 11, which tubes are immediately opposite the glass panels 6 so as to be clearly visible therethrough. In the tube 10 at the top and bottom thereof are perforated cushion blocks 12 secured in any suitable manner and formed of some hard substance, such as vulcanized fiber, wood, possibly metal and the like, and in the tube 11 at the top and bottom thereof are likewise perforated cushion blocks 13 formed of a soft and yielding material such as rubber, felt, or the like, the function of which blocks will be hereinafter explained. The binding nuts 8, 9, are provided with perforations which are concentric with the perforations in the blocks 12, 13, and secured to the bottom of the casing immediately below the nuts 8, 9, are threaded hollow nipples 14, 15, to which nipples in any ordinary manner are secured the air pipes 16, 17 that lead to and are connected with an ordinary two way cock 18 that is secured to any stationary element.

19 is a pump and 20 is a pipe extending from the chamber of the pump and communicating with the cock 18, the arrangement of the pipes 16, 17, 20, with respect to the cock 18 being such that, when the plug of the cock is turned in one direction the pipe 20 will be in direct communication with the pipe 16, while the movement of said plug in the reverse direction will place the pipe 20 in direct communication with the pipe 17.

Both the pump and the cock are automatically operated by the engine, in the manner which I will now describe. I connect the pump piston 21 by a rod 22 to a lever 23 pivoted at 24 to a stationary element. This lever 23 is connected by a link 25 to the cross head 26 of the engine, and the other end of said lever is connected by a rod 27 to the piston rod 28 of the main air pump 29 of the engine. The connection between the cross head 26 and the air pump 29 is of the usual form in marine engines. The air pump 19 is therefore operated at each stroke of the engine.

30 is a small crank secured to and extending from the plug of the cock 18 and connected by rod 31 to the arm 32 of the valve gear, so that when the engine is reversing the plug is turned to admit air from the pipe 20 to the pipe 16.

The valve gear is of the usual type having eccentric rods 33, 34, and a link 35, the latter being connected by rod 36 to the arm 32. When the valve gear is thrown over to the right to reverse the engine and shaft, the arm 32 moves to the right and this turns the plug of the cock 18. From the above it will be readily understood that the air pump 19 and the cock 18, are automatically operated to propel air either through the pipe 16 or the pipe 17 according to the direction in which the main shaft is turning.

$a$ is the main shaft of the engine driven by one or more pistons in appropriate cylinders such as $b$, the extremity of this shaft carrying a propeller (not shown) in the customary manner.

Within the tubes 10, 11, are plungers or pistons 37, 38, made, for instance, of indurated fiber or aluminium, each plunger being preferably elongated so that it cannot turn over in the tube, and cylindrical so that it can rotate more or less freely; each plunger is preferably reduced in diameter between its ends so as to form annular recesses containing a small volume of air around the plunger, so as to prevent sticking of the latter in the tube and thereby minimize friction. The main body of the plunger 37 is colored red while the color of the main body of the other plunger is black, but of course other colors may be utilized it being merely necessary to differentiate between the two plungers.

When the plunger 37 is operating the engine is reversing, and when the plunger 38 is operating the engine is driving ahead, and these plungers will, with absolute certainty, indicate the direction in which the shaft of the engine is turning. At night the glass panels are illuminated by artificial means so that the plungers are visible, and the fact that glass panels are on opposite sides of the inclosing casing is exceedingly advantageous since an officer in charge of the ship may instantly know which plunger is operating whether he stands at one side or the other of the casing. But every time the plunger 37 operates it will strike both at the top and bottom of its stroke against the hard blocks 12 and thereby produce a very audible clack at each impact, and therefore when this clack is heard the officer in charge knows instantly that his engine is reversing, while the operation of the plunger 38 is silent and indicates that the engine is driving ahead.

Since the engine is driving ahead substantially the whole time during its operation, it would be impractical and most annoying were the officer in charge to listen to a constant and unceasing clacking noise, and therefore, according to my present invention, the plunger 38 is absolutely silent as to any noise made by its operation when the engine is driving ahead.

When a vessel is docked or maneuvered, the engine is frequently reversed, and it becomes highly important that the engineer should instantly and properly respond to signals or commands given by the officer in charge of the pilot house, and it therefore becomes important that some means be utilized to accurately determine whether the engineer has correctly understood such signals, and if so whether he has acted in conformity therewith. I have provided a semaphore which acts as a tell tale to prove absolutely the direction in which the shaft was last turned.

39 is a shaft loosely journaled within ears 40 that extend upwardly from the partition 2, and 41 are quadrant shaped plates whose inner portions are rigidly secured to said shaft near opposite ends of the latter, the outer side edges of one of said plates having rigid fingers 42 extending inwardly and at right angles therefrom, which fingers rest upon the binding nuts 8, 9, athwart the perforations therethrough, according to the direction in which the semaphore is thrown.

The semaphore comprises the two plates 41 and the shaft 39, and, referring to Fig. 3, one end of the semaphore is shown resting upon the nut 8, the other end being elevated, which indicates that the engine was last operating to turn the propeller shaft in the direction necessary to drive the vessel ahead. In the back of the indicator in the cover plates 4 are glass panels 44 through which the words " Ahead " and " Astern " are visible, these words being on the outer faces of the plates 41 near the ends thereof.

The semaphore is operated by means of pins 45, 46, projecting respectively from the upper central faces of the plungers 37, 38, which pins have a diameter less than that of the openings in the cushion blocks 12, 13, and binding nuts 8, 9, for the purpose presently to be explained. Presupposing the parts to be in the position as shown at Fig. 3, and the engineer properly responds to a signal to reverse his engine, the plunger 37 shoots upward and the pin 45 strikes the semaphore and throws it over against the nut 9 so that the word " Astern " appears through the panel 44, the plunger 38 having previously dropped to the bottom of the tube 11. Should any question arise as to the direction in which the propeller was last revolved, it can be instantly settled by a glance at the semaphore. As a plunger rises it will drive the air from its tube into the upper part of the casing where it passes down through the cut away portions 3 into the main casing, the air in the latter for the moment being slightly above atmospheric pressure, and as the diameter of the pins 45, 46, is less than that of the perforations in the nuts 8, 9, and blocks 12, 13, the air will pass freely from the tubes into the casing and vice versa from the casing into the tubes when the plungers are operated. The slightly compressed air in the casing materially assists the rapid dropping of the plungers so that when the semaphore is thrown by the action of one of the pistons there can be no question as to the proper working of such plunger and the correspondingly accurate position of the semaphore. As the pump 19 has no valves and simply agitates the air in the closed pipe lines, it may properly be called an "agitator." When the valve gear is in the "off" position so that the engine will not operate, the cock 18 is of course not in communication with either of the pipes 16, 17.

The casing and all pipe connections are air tight, and this is necessary, since moisture or foreign matter within these parts would seriously interfere with the operation of my improvement which is a most sensitive and delicate device, and the importance of its uniform and accurate operation cannot be overestimated. As a plunger rises it will drive the air from its tube into the upper part of the casing where it passes down through the cut away portions 3 into the main casing, the air in the latter for the moment being slightly above atmospheric pressure, meanwhile air being supplied beneath the plunger by the agitator. As the agitator piston is withdrawn the column of air beneath the plunger will sink and the latter will drop, and not only is this dropping motion exceedingly rapid owing to the rapid movements of the agitator piston, but the correspondingly rapid rush of air from the main casing will accelerate this dropping.

For ships having more than one propeller shaft, apparatus such as shown would be arranged for each shaft. The same indicating instruments may be used no matter what the type of engine or motor is, as gas, oil, turbine, &c.

Having thus described my invention what I claim as new and desire to secure by Letters Patent is:—

1. An indicating apparatus, comprising a motor, an agitator driven positively with said motor, an air tight casing, indicator tubes within said casing and communicating therewith and having therein freely movable visual indicator plungers, and pipes connecting the agitator and indicator tubes and constituting closed air trains whereby the plungers are driven upward and assisted downward by the pulsations in the pipes and the entrance of outside air is prevented.

2. An indicating system, comprising a motor, an agitator driven positively with said motor, an air tight casing, indicator tubes in said casing and having communication therewith, freely movable indicator plungers within said tubes and having pin extensions, a gravity operating semaphore pivoted within said casing and adapted to normally rest within the path of one or the other of said extensions, and pipes connecting the agitator and indicator tubes and constituting closed air trains.

In testimony whereof I affix my signature in presence of two witnesses.

ALEXANDER McNAB.

Witnesses:
F. W. SMITH, Jr.,
M. I. LONGDEN.